United States Patent Office 3,833,612
Patented Sept. 3, 1974

3,833,612
DERIVATIVES OF 5 - OXO - 1β-CYCLOPENTANE-HEPTANOIC ACID, 5-ETHYLENE ACETALS
Norman L. Wendler, Summit, David Taub, Metuchen, Harry L. Slates, Westfield, and Zbigniew S. Zelawski, Piscataway, N.J., assignors to Merck & Co., Inc., Rahway, N.J.
No Drawing. Filed Nov. 24, 1971, Ser. No. 201,979
Int. Cl. C07d 13/04
U.S. Cl. 260—340.9        2 Claims

ABSTRACT OF THE DISCLOSURE

Racemic or optically active prostaglandin $E_1$ is synthesized from racemic or optically active precursors in good yield at the various steps from 3α,6,7,7α-tetrahydro-4-methyl-2-oxo - 1β - indaneheptanoic acid methyl ester proceeding through 2β - (2-carboxyethyl)-3β-hydroxy-5-oxo-1β-cyclopentaneheptanoic acid methyl ester, δ-lactone, 5-cyclic ethylene acetal, 2α-(2-carboxy-2-formylethyl)-3β-hydroxy-5-oxo-1β-cyclopentaneheptanoic acid methyl ester, δ-lactone, 5-cyclic ethylene acetal, 2α-(2-carboxy-2-oxoethyl)-3β-hydroxy-5-oxo-1β - cyclopentaneheptanoic acid methyl ester, δ-lactone, 5-cyclic ethylene acetal, and 3β-hydroxy-2α-(3-oxo-1-octenyl)-5-oxo-1β - cyclopentaneheptanoic acid methyl ester, 5-cyclic ethylene acetal.

BRIEF SUMMARY OF THE INVENTION

This invention relates to a new and novel synthesis of prostaglandin $E_1$, and more particularly to a synthesis which has a high degree of stereoselectivity at the points of generating the asymmetric centers of the molecule and produces either racemic or optically active prostaglandin $E_1$, the activity corresponding to that of naturally occurring prostaglandin $E_1$. It relates further to a synthesis in which the yields are high in the several reaction steps. The invention relates still further to the novel compounds obtained as intermediates in the (±) and (−) prostaglandin $E_1$ synthesis and to the process for making such intermediates.

DETAILED DESCRIPTION OF THE INVENTION

Prostaglandin $E_1$, which may be depicted structurally

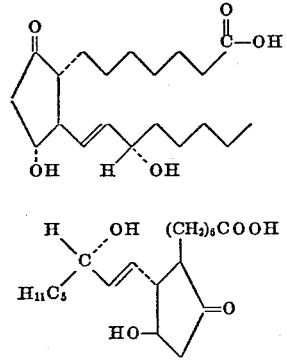

is one of a group of naturally occurring compounds known generally as prostaglandins. These prostaglandins have interesting and important biological activity, the precise biological properties varying with the individual members of the prostaglandin family, as described in the article Prostaglandins, by P. W. Ramwell et al, Progress in the Chemistry of Fats and Other Lipids, Vol. IX, Polyunsaturated Acids, Part 2, pp. 231–273, Pergamon Press (1968).

One of the more important prostaglandins is prostaglandin $E_1$, also known as $PGE_1$. It has an effect on the contractility of smooth muscle and is useful in the induction of labor in pregnant females and for the termination of pregnancies by therapeutic abortion, M. P. Embrey, British Medical Journal, 1970, 2, 256–258; 258–260. Other uses, besides stimulation of smooth muscle, are described in the literature and include the lowering of blood pressure, effect on the mobilization of free fatty acids from adipose tissue, inhibition of lipolysis, and bronchodilating effects.

Heretofore, the supply of prostaglandin $E_1$, as well as of other prostaglandins, has been severely limited because only minute amounts of naturally occurring material are available, and partial biosynthesis by enzymes present in mammalian seminal vesicles has only afforded limited amounts of the products.

An object of this invention is to provide a stereoselective synthesis of (±) prostaglandin $E_1$, which compound has one-half the biological activity of the naturally occurring $PGE_1$, and (−) prostaglandin $E_1$ which compound has 100% of the biological activity of naturally occurring $PGE_1$, and which may be used for the same biological effects as the natural compound.

A further object of the invention is to provide novel intermediate compounds some of which, in addition to being useful in the synthesis of (±) and (−) $PGE_1$, may themselves exhibit prostaglandin-like activity. An additional object is to provide a stereoselective total synthesis of the other members of the prostaglandin group which may be prepared by known methods from (±) and (−) prostaglandin $E_1$. Thus, for instance, (±) prostaglandin $F_{1α}$ may be obtained by reduction of (±) $PGE_1$. Other objects will become evident from the following description of the invention.

The novel process and intermediates of our invention are shown structurally in the following flow diagram, and immediately following this diagram the chemical names of the compounds are set forth.

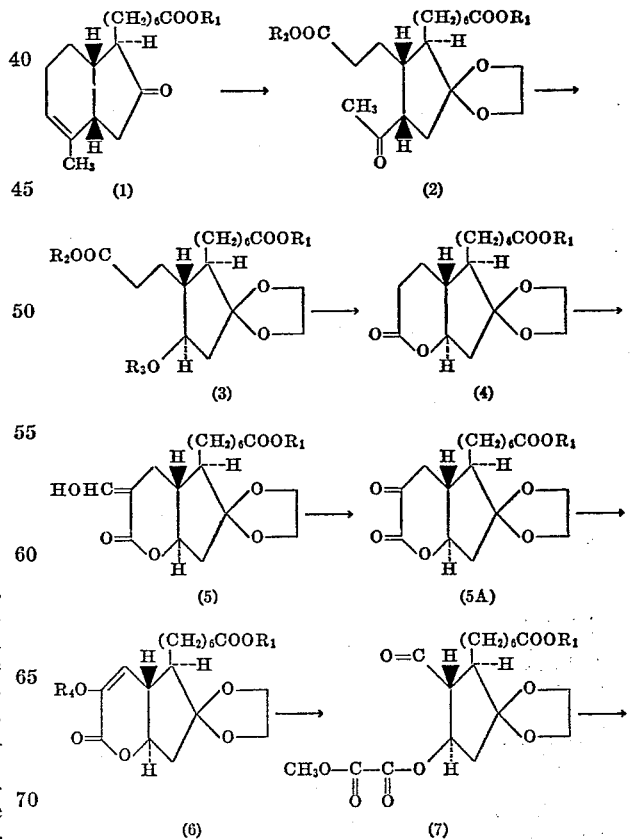

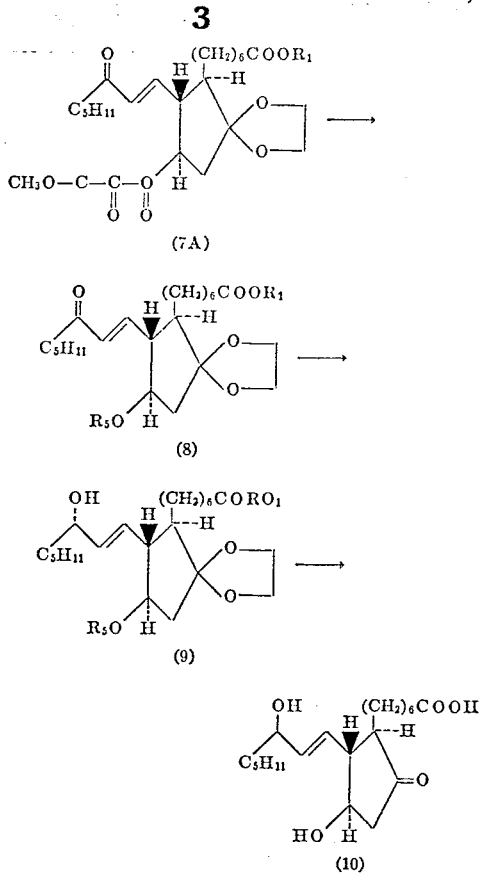

In the foregoing formulas $R_1$ and $R_2$ represent hydrogen, loweralkyl or aralkyl; $R_3$ represents hydrogen or an acetyl group, and $R_4$ and $R_5$ represent hydrogen or acyl. The loweralkyl groups of this invention are those containing from 1 to 6 carbon atoms such as methyl, ethyl, propyl, and hexyl. The acyl groups of this invention are loweralkanoyl groups of from 2 to 6 carbon atoms such as acetyl, propionyl, butyryl, hexanoyl, and the like, and monocyclic aroyl groups such as benzoyl, toluoyl, and the like. The aralkyl groups are defined as loweralkyl groups substituted with an aromatic group of from 6 to 10 carbon atoms. Preferred are benzyl, xylyl and the like.

As a matter of convenience for understanding the foregoing flowsheet and the following description of the invention, there follows a list of names of the chemical compounds 1–10 inclusive.

1. ($R_1$=$CH_3$) 3α,6,7,7α-tetrahydro-4-methyl-2-oxo-1β-indaneheptanoic acid methyl ester, 2-cyclic ethylene acetal.
2. ($R_1$=$CH_3$, $R_2$=H) 3-acetyl-2α-(2-carboxyethyl)-5-oxo-1β-cyclopentaneheptanoic acid methyl ester, 5-cyclic ethylene acetal.
2. ($R_1$=$R_2$=$CH_3$) 3β - acetyl-2α-[2 - (methoxycarbonyl) ethyl]-5-oxo - 1β - cyclopentaneheptanoic acid methyl ester, 5-cyclic ethylene acetal.
3. ($R_1$=$R_2$=$CH_3$, $R_3$=acetyl) 3β - acetoxy - 2α [2-methoxycarbonyl) ethyl]-5-oxo-1β-cyclopentaneheptanoic acid methyl ester, 5-cyclic ethylene acetal.
3. $R_1$=$R_2$=$CH_3$, $R_3$=H) 2α-[2-methoxycarbonylethyl]-3β-hydroxy-5-oxo-1β-cyclopentaneheptanoic acid methyl ester, 5-cyclic ethylene acetal.
4. ($R_1$=$CH_3$) 2α-(2 - carboxyethyl)-3β-hydroxy - 5-oxo-cyclopentaneheptanoic acid methyl ester, -lactone, 5-cyclic ethylene acetal.
5. ($R_1$=$CH_3$) 2α-(2-carboxy-2-formylethyl)-3β-hydroxy-5-oxo-1β-cyclopentaneheptanoic acid methyl ester, -lactone, 5-cyclic ethylene acetal.
5A. 2α-(2-Carboxy - 2 - oxoethyl)-3β-hydroxy-5-oxo-1β-cyclopentaneheptanoic acid methyl ester, -lactone, 5-cyclic ethylene acetal.
6. ($R_1$=$CH_3$, $R_4$=acetyl) 2α - (2 - acetoxy-2-carboxyvinyl)-3β-hydroxy-5-oxo - 1β - cyclopentaneheptanoic acid methyl ester, -lactone, 5-cyclic ethylene acetal.
7. ($R_1$=$CH_3$) 2α-formyl-3β-[(methoxalyl)oxy]-5 - oxo-1β-cyclopentaneheptanoic acid methyl ester, 5-cyclic ethylene acetal.
7A. ($R_1$=$CH_3$) 3β - [(methoxalyl)oxy] - 2α - (3-oxo-1-octenyl)-5-oxo-1β-cyclopentaneheptanoic acid methyl ester, 5-cyclic ethylene acetal.
8. ($R_1$=$CH_3$, $R_5$=H) 3β-hydroxy-2α-(3-oxo-1-octenyl)-5-oxo-1β-cyclopentaneheptanoic acid methyl ester, 5-cyclic ethylene acetal.
9. ($R_1$=$CH_3$, $R_5$=H) Prostaglandin $E_1$ methyl ester, cyclic ethylene acetal.
9. ($R_1$=$R_5$=H) Prostaglandin $E_1$, cyclic ethylene acetal.
10. Prostaglandin $E_1$.

In the foregoing list of names and in subsequent discussions, the esters and acyl groups have been referred to as methyl esters and acetyl groups respectively because the detailed examples refer to such groups; but it is to be understood that other esters are within the scope of the invention as shown by the symbols $R_1$, $R_2$, $R_3$, and $R_4$ in the flow diagram.

The synthesis of prostaglandin $E_1$ in its racemic (±) or natural (−) form starts with 3a,6,7,7a-tetrahydro-4-methyl-2-oxo-1β-indaneheptanoic acid methyl ester (1, $R_1$=$CH_3$) in its racemic or optically active form. The preparation of the racemic and optically active forms of compound 1 are disclosed in U.S. Patent Application Ser. No. 201,959 filed on Nov. 24, 1971.

In the first step of this synthesis either racemic or optically active 3a,6,7,7a-tetrahydro-4-methyl-2-oxo-1β-indaneheptanoic acid methyl ester (1, $R_1$=$CH_3$) is converted to 3a,6,7,7a - tetrahydro - 4 - methyl-2-oxo-1β-indaneheptanoic acid methyl ester, cyclic ethylene acetal by reaction with ethylene glycol in the presence of an acid such as p-toluenesulfonic acid. The resulting acetal is then oxidized with an oxidizing agent such as potassium permanganate preferably in the presence of sodium periodate, to produce 3-acetyl-2α-(2-carboxyethyl)-5-oxo-1β-cyclopentaneheptanoic acid methyl ester, 5-cyclic ethylene acetal (2, $R_1$=$CH_3$, $R_2$=H). It is preferred to include potassium carbonate in the reaction system which facilitates the oxidation as well as partially epimerizing the 3-carbon atom such that the α-acetyl group becomes a β-acetyl group. The reaction product is a mixture of 3α-acetyl and 3β-acetyl-2α-(2-carboxethyl)-5-oxo-1β-cyclopentaneheptanoic acid methyl ester, 5-cyclic ethylene acetal (2, $R_1$=$CH_3$, $R_2$=H).

The epimeric mixture is then treated with an excess of a diazoloweralkane or diazoaralkane to prepare the ester derivative which is then epimerized, forming the 3β-acetyl group from the 3α-acetyl group, with an alkali metal loweralkoxide, preferably the same alkoxide group present on the ester functions in order to prevent transesterification. In order to accomplish this the epimeric mixture is dissolved in a loweralkanol and treated with a loweralkanol solution of the alkali metal alkoxide at from 10 to 50° C., preferably room temperature, for from 10 to 30 hours, affording all 3β-acetyl-2α-2-[methoxycarbonylethyl]-5-oxo-1β-cyclopentaneheptanoic acid methyl ester, 5-cyclic ethylene acetal (2, $R_1$=$R_2$=$CH_3$), with no traces of the 3α-acetyl derivative.

Compound 2-($R_1$=$R_2$=$CH_3$) is then oxidized with an oxidizing agent as such as an organic peracid, preferably trifluoro peracetic acid, m-chloroperbenzoic acid and the like, affording 3β-acetoxy-2α-[2-methoxycarbonylethyl]-5-oxo-1β cyclopentaneheptanoic acid methyl ester, 5-cyclic ethylene acetal (3, $R_1$=$R_2$=$CH_3$, $R_3$=acetyl). The reaction mixture is generally buffered with a weakly alkaline buffering agent such as sodium monohydrogen phosphate. The reaction is run generally at room temperature for from 10 to 30 hours. Thin layer chromatography of an aliquot portion indicates the degree of completion of the reaction and additional oxidizing agent may be added if necessary until the reaction is complete.

Compound 3-($R_1=R_2=CH_3$, $R_3$=acetyl) is treated with an alkali metal alkoxide in the corresponding loweralkanol. The reaction is run for from 1 to 4 hours at about room temperature and worked up by techniques known to those skilled in the art affording 2α-[2-methoxycarbonylethyl]-3β-hydroxy-5 - oxo-1β-cyclopentaneheptanoic acid methyl ester, 5-cyclic ethylene acetal (3, $R_1=R_2=CH_3$, $R_3=H$). The hydroxy compound is then lactonized with an alkali metal alkoxide preferably potassium t-butoxide in an inert solvent such as benzene, toluene, and the like at the reflux temperature of the solvent employed. The solvent is preferably one which codistills with the loweralkanol corresponding to $R_2$.

Distillation of the solvent is continued until a thin layer chromatogram of an aliquot indicates conversion to lactone 4 is complete. This normally requires from 1 to 6 hours of distillation. There is recovered 2α-(2-carboxyethyl)-3β-hydroxy - 5-oxo-1β-cyclopentaneheptanoic acid methyl ester, δ-lactone, 5-cyclic ethylene acetal (4, $R_1=CH_3$).

The next step in the racemic or optically active synthesis is the formylation of compound 4 with a loweralkyl formate in the presence of an alkali metal hydride at from 0° to 40° C. for from ½ to 6 hours. The exothermal nature of the reaction usually necessitates adding the alkali metal hydride portionwise and maintaining the temperature at from 0° to 10° during the first hour of the reaction. The product is 2α-(2-carboxy-2-formylethyl)-3β-hydroxy-5-oxo-1β-cyclopentane heptanoic acid methyl ester, δ-lactone, 5-cyclic ethylene acetal sodium salt, which on treatment with a mild acid such as sodium dihydrogen phosphate in aqueous solution liberates compound 5-($R_1=CH_3$).

The formyl derivative is ozonized in the presence of an organic base such as pyridine at temperatures substantially below 0° C., preferably Dry Ice temperatures, by bubbling ozone or a mixture of $O_2$ and $O_3$ into the reaction mixture until an excess is present, indicated by the presence of a pale blue color. The resulting 2α-(2-carboxy-2-oxoethyl) - 3β-hydroxy-5-oxo-1β-cyclopentaneheptanoic acid methyl ester, δ-lactone, 5-cyclic ethylene acetal (5A, $R_1=CH_3$) which is isolated but not purified is reacted with an acylating agent in the presence of an organic base. Preferred are acetylating agents as acetic anhydride, acetyl chloride, and the like, however, other acylating agents such as benzoyl chloride may be utilized. The reaction is worked up by techniques known to those skilled in the art yielding 2α-(2-acetoxy-2-carboxyvinyl)-3β-hydroxy-5-oxo-1β-cyclopentaneheptanoic acid methyl ester-δ - lactone, 5 - cyclic ethylene acetal (6, $R_1=CH_3$, $R_4$=acetyl).

In the next step the above acyl compound is oxidized with osmium tetroxide in the presence of an alkali metal periodate in methanol. The compound is treated first with the osmium tetroxide until the solution darkens. The alkali metal periodate, preferably sodium periodate is then added portionwise over from 2 to 6 hours and the reaction stirred at about room temperature for from 2 to 6 hours, affording 2α-formyl - 3β - [(methoxalyl)oxy]-5-oxo-1β-cyclopentaneheptanoic acid methyl ester, 5-cyclic ethylene acetal (7, $R_1=CH_3$).

A Wittig reaction is employed to form the octenone side chain at the 2-position of the cyclopentane ring. The formyl compound (7, $R_1=CH_3$) is treated with an alkali metal hydride and dimethyl 2-oxoheptylphosphonate in an anhydrous, inert solvent, such as tetrahydrofuran, dioxane, and the like. The intermediate 3β-[(methoxalyl) oxy]-2α-(3-oxo-1-octenyl) - 5 - oxo - 1β - cyclopentaneheptanoic methyl ester, 5-cyclic ethylene acetal (7A, $R_1=CH_3$) is treated with a 1,2-diamine such as ethylene diamine at from −10° to 25° C. for from 15 minutes to 2 hours cleaving the 3β-methoxalyl-oxy group and affording 3β-hydroxy - 2α - (3-oxo-1-octenyl)-5-oxo-1β-cyclopentaneheptanoic acid methyl ester, 5-cyclic ethylene acetal (8, $R_1=CH_3$, $R_5=H$).

The side chain keto group is reduced to a hydroxyl group with a mild reducing agent such as an alkali metal borohydride. The reduction is complete in from 15 minutes to 2 hours at from −20° to 25° C. The reaction affords a mixture of the R and S stereoisomers because both β- and α-hydroxy groups are formed, of which the α-hydroxy is preferred. The reaction mixture is chromatographed whereupon the isomers are separated and pure prostaglandin $E_1$ methyl ester-5-cyclic ethylene acetal [3β-hydroxy-2α-(3α[S]-hydroxy-1-octenyl) - 5 - oxo-1β-cyclopentaneheptanoic acid methyl ester, 5-cyclic ethylene acetal, (9, $R_1=CH_3$, $R_5=H$)] is obtained. The 3β[R]-hydroxy compound is separately obtained from the chromatographic column, and back oxidized by treatment with manganese dioxide to afford the keto starting material (8, $R_1=CH_3$, $R_5=H$) which can be recycled.

It is advantageous to employ the O-acyl, preferably the acetyl derivative of the 3β-hydroxyl group of compound 8 during the reduction and back oxidation of the side chain keto group. The acyl group has no deleterious effects on the reduction to the hydroxyl group. However, yields are considerably improved during the back-oxidation of the [R] hydroxyl group with manganese dioxide if the acyl group is present.

The final steps in this synthesis of racemic or optically active $PGE_1$ involves the removal of the protecting groups. The esters are hydrolyzed to the free acid using base-catalyzed hydrolysis in aqueous media. Preferred catalysts are alkali metal hydroxides such as potassium hydroxide in aqueous solution at from 0° to 40° C. for from 1 to 5 hours. The thus produced prostaglandin $E_1$-5-cyclic ethylene acetal (9, $R_1=H$, $R_5=H$) is treated with an aqueous acid preferably an organic acid such as acetic acid, at about room temperature for from 1 to 5 hours, cleaving the cyclic acetal and yielding prostaglandin $E_1$.

Depending on whether the starting material (compound 1) is racemic or optically active, racemic or optically active $PGE_1$ will be obtained. No loss in optical activity is observed when optically active (1) is employed; the reaction sequence (1) thru (10) being stereoselective and not tending to the racemization of any of the intermediates.

There are two series of optically active intermediates, one leading to (−) $PGE_1$ and the other to (+) $PGE_1$. The former is the naturally occurring form of $PGE_1$, and the one which possesses all of the biological activity. Both series of intermediates can be prepared using the procedures of the following examples. The series of intermediates leading to the naturally occurring $PGE_1$ is preferred and when referred to hereinbelow are termed "of the natural series."

The following examples are presented in order that the invention might be more readily understood. They should not be construed as being limitative of the invention.

EXAMPLE 1

3α,6,7,7α-tetrahydro-4-methyl-2-oxo-1β-indaneheptanoic acid methyl ester, 2-cyclic ethylene acetal A mixture of 11.8 g. of (±)-3a,6,7,7a-tetrahydro-4-methyl-2-oxo-1β-indaneheptanoic acid methyl ester, 27 ml. of ethylene glycol and 300 mg. of p-toluene sulfonic acid mono-hydrate in 600 ml. of benzene is refluxed with stirring for 18 hours using a Dean-Stark trap to separate the water formed in the reaction. The reaction mixture is cooled and added to 300 ml. of cold 5% potassium bicarbonate. The layers are separated and the aqueous layer extracted twice with 2:1 benzene-hexene. The combined organic fractions are washed 3 times with saturated aqueous sodium chloride, dried over sodium sulfate and evaporated to dryness affording 12.6 g. of (±)-3α,6,7,7α-tetrahydro- 4-methyl-2-oxo-1β-indaneheptanoic acid methyl ester, 2-cyclic ethylene acetal, NMR ($C_6D_6$) δ 3.56 [4H-ethylene group].

When in the above procedure (+)-3α,6,7,7α-tetrahydro-4-methyl - 2 - oxo-1β-indaneheptanoic acid methyl ester $[\alpha]_D^{CHCl_3}+11.6°$ is employed in place of the racemic mixture there is obtained optically active -3α,6,7,7α-tetrahydro-4-methyl - 2 - oxo-1β-indaneheptanoic acid methyl ester, 2-cyclic acetal $[\alpha]_D^{CHCl_3}-26°$.

EXAMPLE 2

3β - Acetyl-2α-(2-methoxycarbonylethyl)-5-oxo-1β-cyclopentaneheptanoic acid methyl ester, 5-cyclic ethylene acetal A. 3 - Acetyl-2α-(2-carboxyethyl)-5-oxo-1β-cyclopentaneheptanoic acid methyl ester, 5-cyclic ethylene acetal.— To a stirred solution of 5.69 g. of (±)-3α,6,7,7α-tetrahydro-4-methyl-2-oxo-1β-indaneheptanoic acid methyl ester, 2-cyclic ethylene acetal in 410 ml. of t-butanol and 11 ml. of water is added a mixture of 5.80 g. of potassium carbonate, 22.8 g. of sodium periodate, and 270 mg. of potassium permanganate in 1230 ml. of water. The reaction mixture is stirred at 20–25° C. for 20 hours and concentrated in vacuo to remove the t-butanol. Ethylene glycol (0.5 ml.) is added and the reaction mixture extracted with 1:1 ether-benzene to remove neutral material. The aqueous layer is acidified with solid sodium dihydrogen phosphate and extracted 4 times with 1:1 ethyl acetate-benzene. The organic layer is dried over sodium sulfate and evaporated to dryness in vacuo affording (±)-3-acetyl-2α-(2-carboxyethyl)-5-oxo-1β-cyclopentaneheptanoic acid methyl ester, 5-cyclic ethylene acetal as a mixture of the 3α and 3β isomers.

B. 3β - Acetyl-2α-(2-methoxycarbonylethyl)-5-oxo-1β-cyclopentaneheptanoic acid methyl ester, 5-cyclic ethylene acetal.—The above (±)-3-acetyl-2α-(2-carboxyethyl)-5-oxo-1β-cyclopentaneheptanoic acid methyl ester, 5-cyclic ethylene acetal is dissolved in 10 ml. of ether and treated with ethereal diazomethane until an excess is present as indicated by a persistent yellow color. After 5 minutes the reaction mixture is evaporated to dryness in vacuo and the residue dissolved in 20 ml. of methanol and 2 ml. of 1N sodium methoxide in methanol is added. The reaction mixture is stirred for 18 hours at room temperature and added to cold saturated aqueous sodium dihydrogen phosphate. The methanol is removed in vacuo and the mixture extracted with 1:1 ethyl acetate-benzene. The organic extract is dried over sodium sulfate and evaporated to dryness affording (±)-3β-acetyl-2α-(2-methoxycarbonylethyl)-5-oxo-1β-cyclopentaneheptanoic acid methyl ester, 5-cyclic ethylene acetal, NMR ($CDCl_3$) δ 2.13 [3H—$CH_3CO$].

When in the above procedures (—)-3α,6,7,7α-tetrahydro-4-methyl-2-oxo-1β-indaneheptanoic acid methyl ester, 2-cyclic ethylene acetal is employed in place of the racemic compound there is obtained (+) - 3β-acetyl-2α-(2-methoxycarbonylethyl)-5-oxo-1β-cyclopentaneheptanoic acid, methyl ester, 5-cyclic ethylene acetal, $[\alpha]_D^{CHCl_3}+6.8°$.

EXAMPLE 3

3β - Acetoxy - 2α - (2-methoxycarbonylethyl)-5-oxo-1β-cyclopentaneheptanoic acid methylester, 5-cyclic ethylene acetal 60 g. of solid disodium monohydrogen phosphate is added to a stirred solution of 4.50 g. of (±)-3β-acetyl-2α-(2-methoxycarbonylethyl) - 5 - oxo-1β-cyclopentaneheptanoic acid methyl ester, 5-cyclic ethylene acetal in 25 ml. of methylene chloride and the mixture cooled to 0° C. 45 ml. of freshly prepared 0.3M trifluoroperacetic acid in methylene chloride is added and the reaction mixture stirred for 18 hours at room temperature. A thin layer chromatogram of an aliquot portion of the reaction mixture indicates the reaction to be about 60% complete. An additional 40 ml. of the 0.3M trifluoroperacetic acid in methylene chloride is added. After stirring an additional 24 hours the reaction is complete. The reaction is filtered, the precipitate washed with methylene chloride and the combined filtrates washed with cold aqueous potassium iodide and cold aqueous sodium thiosulfate to remove residual peracid. The organic extract is washed with water, dilute aqueous potassium bicarbonate and saturated aqueous sodium chloride. The organic layer is dried over sodium sulfate and evaporated to dryness in vacuo affording (±) - 3β - acetoxy 2α-(2-methoxycarbonylethyl)-5-oxo-1β-cyclopentaneheptanoic acid methyl ester, 5-cyclic ethylene acetal as a colorless oil, NMR ($CDCl_3$) δ 2.01 [3H—$CH_3COO$].

When in the above procedure (+)-3β-acetyl-2α-(2-methoxycarbonylethyl) - 5-oxo-1β-cyclopentaneheptanoic acid methyl ester, 5-cyclic ethylene acetal is employed in place of the racemic mixture there is obtained optically active 3β-acetoxy-2α-(2-methoxycarbonylethyl)-5-oxo-1β-cyclopentaneheptanoic acid methyl ester, 5-cyclic ethylene acetal, of the natural series.

EXAMPLE 4

2α - (2 - Carboxyethyl)-3β-hydroxy-5-oxo-1β-cyclopentaneheptanoic acid methyl ester, δ-lactone, 5-cyclic ethylene acetal A. 2α-(2-methoxycarbonylethyl)-3β-hydroxy-5-oxo-1β-cyclopentaneheptanoic acid methyl ester, 5-cyclic ethylene acetal.—6 ml. of 1.00N sodium methoxide is added to a stirred solution of 4.25 g. of (±)-3β-acetoxy-2α-(2-methoxycarbonylethyl)-5-oxo-1β-cyclopentaneheptanoic acid methyl ester, 5-cyclic ethylene acetal in 25 ml. of methanol under a nitrogen atmosphere and stirred at room temperature for 2 hours. The reaction mixture is poured into excess cold saturated aqueous sodium dihydrogen phosphate and extracted with 1:1 ethyl acetate-benzene. The organic extract is dried over sodium sulfate and evaporated to dryness in vacuo. The residue is purified chromatigraphically employing 180 g. of silica gel and eluting with 25% acetone in chloroform affording pure (±)-2α-(2-methoxycarbonylethyl) - 3β - hydroxy-5-oxo-1β-cyclopentaneheptanoic acid methyl ester, 5-cyclic ethylene acetal.

When in the above procedure optically active-3β-acetoxy-2α-(2-methoxycarbonylethyl) - 5 - oxo-1β-cyclopentaneheptanoic acid methyl ester, 5-cyclic ethylene acetal of the natural series is employed in place of the racemic mixture there is obtained (+)-2α-(2-methoxycarbonylethyl)-3β-hydroxy - 5 - oxo-1β-cyclopentaneheptanoic acid methyl ester, 5-cyclic ethylene acetal $[\alpha]_D^{CHCl_3}+14.7°$.

B. 2α-(2-carboxyethyl)-3β-hydroxy - 5 - oxo-1β-cyclopentaneheptanoic acid methyl ester δ-lactone, 5-cyclic ethylene acetal.—1.66 g. of (±)-2α-(2-methoxycarbonylethyl)-3β-hydroxy - 5 - oxo-1β-cyclopentaneheptanoic acid methyl ester, 5-cyclic ethylene acetal is dissolved in 350 ml. of benzene in a nitrogen atmosphere and rendered anhydrous by removing 30 ml. of benzene by distillation. 0.25 ml. of 0.66M potassium t-butoxide in t-butanol is added and an additional 140 ml. of benzene removed by distillation over a period of 4 hours. The reaction mixture is cooled, added to cold saturated aqueous sodium dihydrogen phosphate, and extracted with benzene. The combined organic layers are washed with saturated aqueous sodium chloride, dried over sodium sulfate, and evaporated to dryness in vacuo affording (±)-2α-(2-carboxyethyl)-3β-hydroxy - 5-oxo-1β-cyclopentaneheptanoic acid methyl ester, δ-lactone, 5-cyclic ethylene acetal as a pale yellow oil.

When in the above procedure (+)-2α-(2-methoxycarbonylethyl)-3β-hydroxy - 5 - oxo-1β-cyclopentaneheptanoic acid methyl ester, 5-cyclic ethylene acetal is employed in place of the racemic mixture there is obtained optically active 2α-(2-carboxyethyl)-3β-hydroxy-5-oxo-1β-cyclopentaneheptanoic acid methyl ester, δ-lactone, 5-cyclic ethylene acetal of the natural series.

EXAMPLE 5

2α-(2-carboxy - 2 - formylethyl)-3β-hydroxy-5-oxo-1β-cyclopentaneheptanoic acid methyl ester, δ-lactone, 5-cyclic ethylene acetal 210 mg. of 50% sodium hydride dispersion is added to a stirred solution of 1.36 g. of (±)-2α-(2-carboxyethyl)-3β-hydroxy - 5 - oxo-1β-cyclopentaneheptanoic acid methyl ester, δ-lactone, 5-cyclic ethylene acetal in 25 ml. of methyl formate under a nitrogen atmosphere over a period of 3 minutes at 0° C. The reaction mixture is stirred for 1 hour at 0° C. and 4 hours at 20° C. The solvent is removed in vacuo and the residue triturated with ether and the precipitate filtered and washed with ether. The precipitate is dissolved in cold saturated aqueous sodium dihydrogen phosphate, extracted with ethyl acetate, dried over sodium sulfate and evaporated to dryness. The residue is crystallized from ether-hexane affording (±)-2α-(2-carboxy-2-formylethyl)-3β-hydroxy - 5 - oxo - 1β - cyclopentaneheptanoic acid methyl ester, δ-lactone, 5-cyclic ethylene acetal, m.p. 88–90° C.

When in the above procedure optically active-2α-(2-carboxyethyl)-3β-hydroxy - 5 - oxo-1β-cyclopentaneheptanoic acid methyl ester, δ-lactone, 5-cyclic ethylene acetal of the natural series is employed in place of the racemic mixture, there is obtained optically active 2α-(2-carboxy-2-formylethyl)-3β-hydroxy-5 - oxo - 1β - cyclopentaneheptanoic acid methyl ester, δ-lactone, 5-cyclic ethylene acetal, of the natural series, m.p. 80–81°.

EXAMPLE 6

2α-(2-acetoxy - 2 - carboxyvinyl)-3β-hydroxy-5-oxo-1β-cyclopentaneheptanoic acid methyl ester, δ-lactone, 5-cyclic ethylene acetal A. 2α-(2-carboxy - 2 - oxoethyl)-3β-hydroxy-5-oxo-1β-cyclopentaneheptanoic acid methyl ester, δ-lactone, 5-cyclic ethylene acetal.—A solution of 460 mg. of (±)-2α-(2-carboxy - 2 - formylethyl)-3β-hydroxy-5-oxo-1β-cyclopentaneheptanoic acid methyl ester, δ-lactone, 5-cyclic ethylene acetal in 6 ml. of methylene chloride and 4.4 ml. of pyridine is cooled to —70° C. and treated with a 5% ozone-oxygen mixture until an excess of ozone is present as indicated by a persistent pale blue color. The excess ozone is evaporated by bubbling nitrogen into the reaction mixture and the solvents are removed in vacuo. The residue is triturated with ether affording crystalline (±)-2α-(2-carboxy - 2 - oxoethyl)-3β-hydroxy - 5 - oxo-1β-cyclopentane heptanoic acid methyl ester, δ-lactone, 5-cyclic ethylene acetal, m.p. 114–116° C.

B. 2α-(2-acetoxy - 2 - carboxyvinyl) - 3β - hydroxy-5-oxo-1β-cyclopentaneheptanoic acid methyl ester, δ-lactone, 5-cyclic ethylene acetal.—The ozonolysis product is acetylated in 6 ml. of pyridine and 3 ml. of acetic anhydride at room temperature for 17 hours. 6 ml. of xylene is added and the reaction mixture evaporated to dryness in vacuo. The residue is triturated with ether-hexane affording crystalline (±)-2α-(2-acetoxy-2-carboxyvinyl)-3β-hydroxy-5-oxo-1β-cyclopentaneheptanoic acid methyl ester, δ-lactone, 5-cyclic ethylene acetal, m.p. 82–84° C.

When in the above procedure optically active-2α-(2-carboxy - 2 - formylethyl)-3β-hydroxy-5-oxo-1β-cyclopentaneheptanoic acid methyl ester, δ-lactone, 5-cyclic ethylene acetal is employed in place of the racemic mixture, there is obtained (+)-2α(2-acetoxy-2-carboxyvinyl)-3β-hydroxy - 5 - oxo-1β-cyclopentaneheptanoic acid methyl ester, δ-lactone, 5-cyclic ethylene acetal $[\alpha]_D^{CHCl_3}+30°$ of the natural series.

EXAMPLE 7

2α-formyl-3β-[(methoxalyl)oxy] - 5 - oxo - 1β - cyclopentaneheptanoic acid methyl ester, 5-cyclic ethylene acetal 14 mg. of osmium tetroxide in 1.4 ml. of methanol is added to a stirred solution of 430 mg. of (±)-2α(2-acetoxy - 2 - carboxyvinyl) - 3β - hydroxy-5-oxo-1β-cyclopentaneheptanoic acid methyl ester, δ-lactone, 5-cyclic ethylene acetal in 16 ml. of methanol. The reaction mixture darkens in 10–15 minutes and 440 mg. of powdered sodium periodate is added portionwise over 3 hours. The reaction mixture is stirred for 1 additional hour, filtered, and the filtrate evaporated to dryness in vacuo. The residue is dissolved in 2.5 ml. of 1:1 ethyl acetate-benzene and the solution washed with water and saturated aqueous sodium chloride. The organic layer is dried over sodium sulfate and evaporated to dryness in vacuo affording (±)-2α-formyl-3β-[(methoxalyl)oxy] - 5 - oxo-1β-cyclopentaneheptanoic acid methyl ester, 5-cyclic ethylene acetal as an oil.

When in the above procedure (+)-2α-(2-acetoxy-2-carboxyvinyl - 3β - hydroxy-5-oxo-1β-cyclopentaneheptanoic acid methyl ester, δ-lactone, 5-cyclic ethylene acetal is employed in place of the racemic mixture, there is obtained optically active - 2α - formyl - 3β - [(methoxalyl)oxy] - 5 - oxo - 1β-cyclopentaneheptanoic acid methyl ester, 5-cyclic ethylene acetal, of the natural series.

EXAMPLE 8

3β-Hydroxy - 2α - (3-oxo-1-octenyl)-5-oxo - 1β - cyclopentaneheptanoic acid methyl ester, 5-cyclic ethylene acetal A. 3β-[(methoxalyl)oxy] - 2α - (3-oxo - 1 - octenyl)-5-oxo - 1β - cyclopentaneheptanoic acid methyl ester, 5-cyclic ethylene acetal.—230 mg. of dimethyl-2-oxoheptyl phosphonate in 4 ml. of tetrahydrofuran is added to a stirred suspension of 50 mg. of 50% sodium hydride dispersion in 10 ml. of tetrahydrofuran under a nitrogen atmosphere at 0° C. The reaction mixture is stirred at 0° C. for 30 minutes and a solution of 420 mg. of (±)-2α-formyl - 3β - [(methoxalyl)oxy] - 5 - oxo-1β-cyclopentaneheptanoic acid methyl ester, 5-cyclic ethylene acetal in 4 ml. of tetrahydrofuran is added dropwise over 5 minutes. After 10 minutes the mixture is allowed to warm to room temperature and stirred for 2 hours. The reaction is cooled to 10° C., added to cold saturated aqueous sodium dihydrogen phosphate and extracted with ethyl acetate. The organic extract is washed with saturated aqueous sodium chloride, stirred over sodium sulfate, and evaporated to dryness in vacuo affording (±)-3β-[(methoxalyl)oxy]-2α-(3-oxo - 1 - octenyl)-5-oxo-1β-cyclopentaneheptanoic acid methyl ester, 5-cyclic ethylene acetal containing a smaller amount of (±)-3β-hydroxy - 2α - (3 - oxo-1-octenyl)-5-oxo - 1β - cyclopentaneheptanoic acid methyl ester, 5-cyclic ethylene acetal.

B. 3β-Hydroxy - 2α - (3-oxo-1-octenyl) - 5 - oxo-1β-cyclopentaneheptanoic acid methyl ester, 5-cyclic ethylene acetal.—The above mixture is dissolved in 7.5 ml. of methanol and 60 mg. of ethylenediamine in 5 ml. of methanol added dropwise at 0° C. The reaction mixture is stirred for 45 minutes at 20° C. and the solvent remover in vacuo. The residue is partitioned between ethyl acetate and saturated aqueous sodium dihydrogen phosphate. The layers are separated and the aqueous layer extracted with ethyl acetate. The combined extracts are dried and evaporated to dryness in vacuo. The residue is chromatographed on 35 g. of silica gel eluting with 30% acetone and chloroform taking 40 fractions of 4 ml. each. Fractions 5–14 are combined and evaporated to dryness in vacuo affording 250 mg. of pure (±)-3β-hydroxy-2α-(3-oxo-1-octenyl) - 5 - oxo - 1β - cyclopentaneheptanoic acid methyl ester, 5-cyclic ethylene acetal, λ max. (methanol=232 nm. (E 12,500).

When in the above procedure, optically active - 3β-[(methoxalyl)oxy] - 5 - oxo - 1β - cyclopentaneheptanoic acid methyl ester, 5-cyclic ethylene acetal of the natural series is employed in place of the racemic mixture, there is obtained optically active-(3β-hydroxy - 2α - (3-oxo-1-octenyl) - 5 - oxo-1β-cyclopentaneheptanoic acid methyl ester, 5-cyclic ethylene acetal.

EXAMPLE 9

Prostaglandin $E_1$, methyl ester, cyclic ethylene acetal. [3β-hydroxy - 2α - (3¹[S] - hydroxy - 1 - octenyl)-5-oxo - 1β - cyclopentaneheptanoic acid methyl ester, 5-cyclic ethylene acetal]

23 mg. of sodium borohydride in 2 ml. of methanol at —10° C. is added dropwise to a stirred solution of 245 mg. of (±)-3β-hydroxy - 2α - (3-oxo - 1 - octenyl)-5-oxo-1β-cyclopentaneheptanoic acid methyl ester, 5-cyclic ethylene acetal in 6 ml. of methanol at —10° C. The reaction mixture is stirred for 40 minutes at —10° C. and added to 50 ml. of saturated sodium dihydrogen phosphate and extracted with ethyl acetate. The extracts are washed with saturated aqueous sodium chloride, dried over sodium sulfate, and evaporated to dryness in vacuo. The residue is chromatographed on 20 g. of silica gel eluting with 50% acetone-chloroform and collecting 50 fractions of 8 ml. each. Fractions 8–18 are combined and evaporated to dryness affording (±)-3β-hydroxy-2α-(3[R]hydroxy-1-octenyl) - 5 - oxo - 1β - cyclopentaneheptanoic acid methyl ester, 5-cyclic ethylene acetal. The 3β[R]isomer (100 mg.) is dissolved in 5 ml. of ethyl acetate and stirred with 2 g. of activated manganese dioxide for 6 hours. The mixture is filtered, the precipitate washed with acetone and the combined filtrates and washings evaporated to dryness in vacuo affording recyclicable (±)-3β-hydroxy-2α-(3-oxo-1-octenyl)-5-oxo - 1β - cyclopentaneheptanoic acid methyl ester, 5 -cyclic ethylene acetal.

Fractions 21–25 are combined and evaporated to dryness affording (±)-3β-hydroxy - 2α - (3[S]-hydroxy-1-octenyl)-5-oxo - 1β - cyclopentaneheptanoic acid methyl ester, 5-cyclic ethylene acetal m.p. 54–56° C.

When in the above procedure optically active - 3β-hydroxy-2α-(3-oxo - 1 - octenyl)-5-oxo-1β-cyclopentaneheptanoic acid methyl ester, 5-cyclic ethylene acetal is employed in place of the racemic mixture, there is obtained optically active prostaglandin $E_1$, methyl ester, cyclic ethylene acetal, [3β-hydroxy - 2α - (3[S]-hydroxy-1-octenyl) - 5 - oxo - 1β - cyclopentaneheptanoic acid methyl ester, 5-cyclic ethylene acetal] of the natural series, m.p. 48–51° C.

EXAMPLE 10

Prostaglandin $E_1$, cyclic ethylene acetal. [3β - hydroxy-2α-(3[S]hydroxy-1-octenyl) - 5 - oxo-1β-oxocyclopentaneheptanoic acid, 5-cyclic ethylene acetal]

A solution of 45 mg. of potassium hydroxide in 2.5 ml. of water at 0° C. is added dropwise to a solution of 40 mg. of (±)-3β-hydroxy - 2α - (3[S]hydroxy-1-octenyl)-5-oxo - 1β - cyclopentaneheptanoic acid methyl ester, 5-cyclic ethylene acetal in 1 ml. of methanol at 0° C. in a nitrogen atmosphere. The reaction mixture is allowed to warm to room temperature and stirred for 3 hours. Cold dilute aqueous potassium bicarbonate is added to the reaction mixture and the mixture extracted with hexane. Solid sodium dihydrogen phosphate is added to the aqueous layer and the latter is extracted with 1:1 ethyl acetate-benzene. The organic layer is dried over sodium sulfate and evaporated to dryness in vacuo affording (±)-prostaglandin $E_1$, 5-cyclic ethylene acetal [(±)-3β-hydroxy-2α-(3[S]-hydroxy - 1 - octenyl) - 5 - oxo - 1β - oxocyclopentaneheptanoic acid, 5-cyclic ethylene acetal] m.p. 82–84° C.

When in the above procedure optically active 3β-hydroxy - 2α - (3[S]hydroxy - 1 - octenyl)-5-oxo-1β-cyclopentaneheptanoic acid methyl ester, 5 - cyclic ethylene acetal of the natural series is employed in place of the racemic mixture there is obtained optically active prostaglandin $E_1$, 5-cyclic ethylene acetal of the natural series, m.p. 81–83° C.

EXAMPLE 11

Prostaglandin $E_1$

A mixture of 37 mg. of (±)-prostaglandin $E_1$, 5-cyclic ethylene acetal and 3 ml. of 1:1 acetic acid-water is stirred at 25° C. for 3 hours. Saturated aqueous sodium hydrogen phosphate solution is added and the reaction mixture extracted with 1:1 ethyl acetate-benzene. The organic layer is washed with saturated aqueous sodium chloride, dried over sodium sulfate and evaporated to dryness in vacuo affording a crystalline residue which is recrystallized from ethyl acetate-benzene affording (±)-prostaglandin $E_1$, m.p. 111–113° C.

When in the above procedure optically active prostaglandin $E_1$, cyclic ethylene acetal of the natural series is employed in place of the racemic mixture, there is obtained (—)-prostaglandin $E_1$, m.p. 112–113° C. $[\alpha]_d^{THF}$ —58°.

What is claimed is:

1. The loweralkyl, benzyl and xylyl esters of 3β - hydroxy - 2α - (3[S]-hydroxy - 1 - octenyl)-5-oxo-1β-cyclopentaneheptanoic acid, 5-cyclic ethylene acetal and stereoisomers thereof.

2. The compound of Claim 1 in which the loweralkyl ester is the methyl ester.

References Cited

Taub, et al., "Chemical Communications" (Eng.) D, 1970, pp. 1258–9.

DONALD G. DAUS, Primary Examiner

J. H. TURNIPSEED, Assistant Examiner

U.S. Cl. X.R.

260—468 R, 468 D, 485 L, 514 D; 424—305